(12) United States Patent
Krishnan (10) Patent No.: US 10,104,416 B2
(45) Date of Patent: *Oct. 16, 2018

(54) GENERATING AN AUTOMATED MULTIMEDIA FEED BASED ON CUSTOMER SPECIFIC APPLICATION SOFTWARE RUNNING ON CUSTOMER DATA CENTER/CLOUD

(71) Applicant: VMWARE, INC., Palo Alto, CA (US)

(72) Inventor: Manoj Krishnan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,496

(22) Filed: Jul. 6, 2015

(65) Prior Publication Data

US 2016/0330498 A1 Nov. 10, 2016

(30) Foreign Application Priority Data

May 8, 2015 (IN) .......................... 2342/CHE/2015

(51) Int. Cl.
| | | |
|---|---|---|
| *H04N 21/2668* | (2011.01) | |
| *H04N 21/258* | (2011.01) | |
| *H04N 21/4627* | (2011.01) | |
| *H04N 21/488* | (2011.01) | |
| *H04N 21/254* | (2011.01) | |

(52) U.S. Cl.
CPC ..... *H04N 21/2668* (2013.01); *H04N 21/2541* (2013.01); *H04N 21/25858* (2013.01); *H04N 21/4627* (2013.01); *H04N 21/488* (2013.01)

(58) Field of Classification Search
CPC .......... H04N 21/2668; H04N 21/2541; H04N 21/4627; H04N 21/488; H04N 21/25858; G06Q 30/06; H04L 2463/101; H04L 63/0823; H04L 67/26; H04L 67/306; G06F 17/30867

See application file for complete search history.

(56) References Cited

U.S. PATENT DOCUMENTS

| | | | |
|---|---|---|---|
| 2003/0229900 A1 | 12/2003 | Reisman | |
| 2006/0167860 A1* | 7/2006 | Eliashberg | ............. G06Q 30/06 |
| 2012/0185922 A1* | 7/2012 | Kamity | ............ H04N 21/25875 726/4 |
| 2012/0221640 A1 | 8/2012 | Cohen | |
| 2015/0237091 A1 | 8/2015 | Liang et al. | |
| 2016/0182583 A1* | 6/2016 | Jha | .......................... H04L 69/40 709/219 |

\* cited by examiner

*Primary Examiner* — Benjamin R Bruckart
*Assistant Examiner* — Tien M Nguyen (57) ABSTRACT

Techniques for generating multimedia feed based on customer specific application software running on customer datacenters and/or cloud are described. In one example embodiment, a request to dynamically render multimedia feed associated with the customer specific application software is received via a user's multimedia device. The user's privileges are then verified by mapping the user to a defined one of roles. The customer relevant data is then obtained using news feed plug-ins based on the outcome of verified user's privileges. A three-dimensional (3D) multimedia feed is then generated by compiling the obtained customer relevant data. The three-dimensional (3D) multimedia feed is then dynamically rendered to the user's multimedia device.

24 Claims, 5 Drawing Sheets

GENERATING AN AUTOMATED MULTIMEDIA FEED BASED ON CUSTOMER SPECIFIC APPLICATION SOFTWARE RUNNING ON CUSTOMER DATA CENTER/CLOUD

RELATED APPLICATIONS

Benefit is claimed under 35 U.S.C. 119(a)-(d) to Foreign application Serial No. 2342/CHE/2015 filed in India entitled "GENERATING AN AUTOMATED MULTIMEDIA FEED BASED ON CUSTOMER SPECIFIC APPLICATION SOFTWARE RUNNING ON CUSTOMER DATA CENTER/CLOUD", on May 8, 2015, by VMware, Inc., which is herein incorporated in its entirety by reference for all purposes.

BACKGROUND

Generally, software applications running on customer datacenters and existing information technology (IT) management systems provide a web-based user interface to report information needed to proactively ensure health, risk, efficiency, productivity, financial, sales, compliance and other such information. For example, insurance company may be interested knowing how many new policies were added in the recent quarter and a bank may be interested in knowing how many new accounts were opened and so on. Most existing solutions provide such information via email, short messaging service (SMS), simple network management protocol (SNMP). Web-based alerting and the like. Such systems, typically, pack a large number of features to assist users, drill down to manage such issues in a datacenter. Further, typically, existing systems require the users to be highly proficient in compiling all the pieces of reported information to make any meaningful sense of the reported information. Furthermore, the existing systems may require a significant amount of high level training in order to attain any proficiency in understanding and using such reported information.

SUMMARY

One or more embodiments disclosed herein provide a method for generating an automated multimedia feed based on software applications running on customer datacenters/clouds. In one aspect, the method includes receiving a request to dynamically render multimedia feed associated with the customer specific application software via a user's multimedia device. The user's privileges are then verified by mapping the user to a defined one of roles. The customer relevant data is then obtained from the customer specific application software using news feed plug-in based on the outcome of verified user's privileges. A three-dimensional (3D) multimedia feed is generated by compiling the obtained customer relevant data. The three-dimensional (3D) multimedia feed is then dynamically rendered to the user's multimedia device.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution customer datacenter and/or cloud. The instructions, when executed in a computing device, perform the steps of automatic generation of multimedia feed based on customer specific application software running on customer datacenters and/or clouds.

Embodiments of the present disclosure provide a computer system. The computing system includes multiple customer specific software applications running on a customer datacenter and/or cloud. The customer datacenter and/or cloud include a one or more news feed plug-ins. Further, the computing system includes a management server that is communicatively coupled to the customer datacenter and/or cloud via a network, wherein the management server includes a virtual management software (VMS), which further includes an asynchronous processing module, wherein the asynchronous processing module is configured to automatically generate multimedia feed based on customer specific application software running in customer datacenters and/or clouds and also based on customer's needs and interests.

DETAILED DESCRIPTION

Embodiments described herein provide a technique for automatically generating multimedia feed based on customer specific application software running on customer datacenters and/or clouds. The technique provides an on-demand news channel, which generates and reports out specific matters of interest to customers via audio-visual news. Also, the technique provides a three-dimensional (3D) view of matters of interest via audio-visual news. Further, the technique is designed to provide smart and intuitive presentation of matters of interest to customers that can bring about a big change in the way management software is perceived today. Furthermore, the technique achieves this by one approach of presenting such information via a news channel. Moreover, the news channel may be configured to broadcast audiovisual (A/V) information about the datacenter objects to highlight the problem areas that may need user attention.

In addition, the technique is configured to provide three-dimensional (3D) view of customer relevant data, which are dynamically rendered, can draw attention to the object in context. The audio aspect of the information presented via the news channel may be subjective based on the customer relevant data. Such intelligent, effective and consistent reporting of A/V information can promote efficiency and productivity within a customer's organization. The A/V information is provided to any average user who may not be proficient with using existing management software. Further, such reporting of A/V information may invite attention of customers and may assist customers to visualize the extent of achieved efficiency, compliance and/or productivity. Furthermore, it can be seen that such A/V information can be secured and rendered based on user's roles. Moreover, such A/V information can highlight customer operational information intuitively to the users. It can be a laidback approach to present customer relevant data through on-demand news from any device that supports video playback.

The terms "placing" and "provisioning" are used interchangeably throughout the document. Also, the terms "application software" and "software application" are used interchangeably throughout the document. In addition, the terms "users" and "customers" are being used interchangeably throughout the document.

System Overview and Examples of Operation

Figure 1:
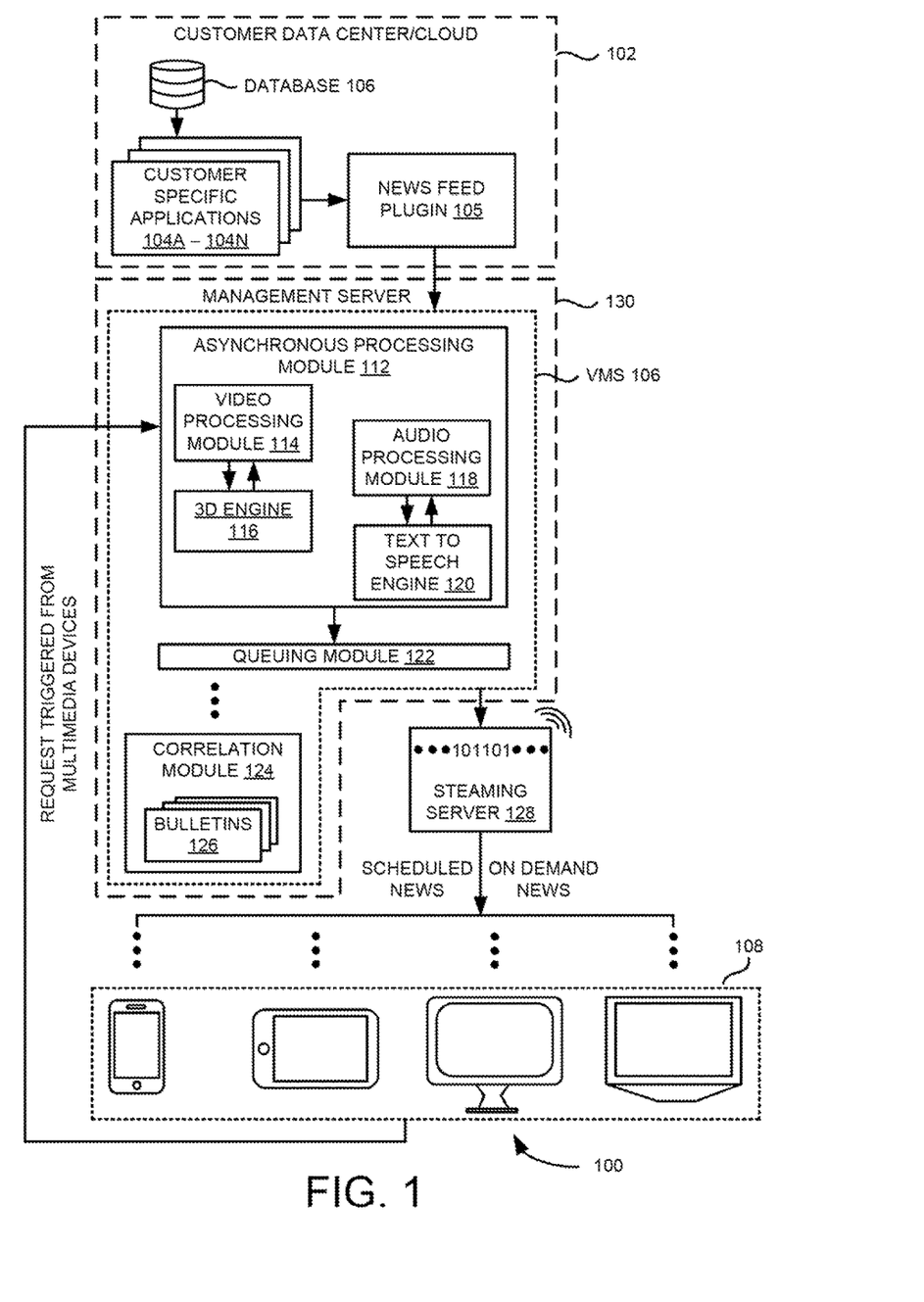
FIG. 1 is a block diagram illustrating a system for generating automated multimedia feed based on customer specific application software running on customer datacenter, according to an example embodiment.

FIG. 1 is a block diagram illustrating a system 100 for automatic generation of multimedia feed based on customer specific application software running on customer datacenters 102, according to an example embodiment. As shown in FIG. 1, system 100 includes a customer data center/cloud 102. Further as shown in FIG. 1, customer datacenter/cloud includes database 106, customer specific applications 104 A-N and news feed plug-in 105. Database 106 is the source of customer relevant data. Also as shown in FIG. 1, system 100 includes management server 130 that is communicatively coupled to customer datacenter/cloud 102 via news feed plug-in 105. Furthermore as shown in FIG. 1, management server 130 includes virtual management software (VMS) 106, which in turn includes asynchronous processing module 112. In addition as shown in FIG. 1, management server 130 is coupled to streaming server 128. Moreover as shown in FIG. 1, the streaming server 128 is communicatively coupled to user's multimedia devices 108.

Further as shown in FIG. 1, asynchronous processing module 112 includes asynchronous processing module 112, queuing module 122, and correlation module 124. Furthermore as shown in FIG. 1, asynchronous processing module 112 includes audio processing module 118 that is coupled to text-to-speech engine 120 and video processing module 114 that is coupled to—3D engine 116. In addition as shown in FIG. 1, the asynchronous processing module 112 is coupled to streaming server 128, which in turn is coupled to user's multimedia devices 108.

In operation, asynchronous processing module 112 receives are quest to dynamically render multimedia feed associated with the customer specific application software via a user's multimedia device 108. Example user's multimedia devices 124 are mobile computing devices and desktop computing devices. Example mobile computing devices are smartphones, notepads, laptops and the like. Example multimedia feed are audio feed and/or video feed.

Further in operation, asynchronous processing module 112 verifies the user's privileges by mapping the user to a defined one of roles. Example defined roles are administrator, manager, executive, director and the like. The asynchronous processing module 112 then obtains customer relevant data from the customer specific application software using news feed plug-in 105 based on the outcome of the verified user's privileges. Example relevant data are health information, risk information, efficiency data, productivity data, financial information, sales information, compliance data, alerts, messages, events, views, relationships with resources, reports and the like.

Furthermore in operation, asynchronous processing module 112 compiles the obtained customer relevant data and generates multimedia feed. In some embodiments, multimedia feed is three-dimensional (3D) multimedia feed.

In addition in operation, asynchronous processing module 112 is configured to generate 3D multimedia feed using the compiled customer relevant data. Asynchronous processing module 112 dynamically renders the 3D multimedia feed to the one or more user's multimedia devices 108. In these embodiments, asynchronous processing module 112 dynamically renders the 3D multimedia feed by substantially simultaneously combining both the audio feed and the video feed.

In some embodiments, asynchronous processing module 112 generates the audio feed by converting subjective meaning text in the obtained relevant data. In these embodiments, audio processing module 114 and text-to-speech engine 120 are used to generate the audio feed. Further in some embodiments, asynchronous processing module 112 maintains a database of descriptive texts for each type of customer relevant data to report out via multimedia feed. Asynchronous processing module 112 then generates the audio feed by mapping subjective meaningful text in the obtained customer relevant data to the descriptive texts stored in the database.

Further in some embodiments, asynchronous processing module 112 assigns a unique tag id, such as universally unique identification (UUID), for each message in the obtained customer relevant data. Asynchronous processing module 112 then parses each message having associated UUID into one or more audio messages and one or more video messages. Audio processing module 118 and video processing module 114 then generates one or more audio feeds and associated one or more video feeds using the associated parsed one or more audio messages and one or more video messages having the same assigned UUID, respectively. In some embodiments, video processing module 114 along with the 3D engine 116 is used to generate one or more 3D video feeds. Also in these embodiments, audio processing module 118 along with text-to-speech engine 120 is used to generate one or more associated audio feeds. Queuing module 122 is then used to queue until the associated one or more audio feeds and the one or more video feeds having same UUIDs are received. Correlation module 124 then correlates the one or more audio feeds and the one or more video feeds received from the queuing module 122 to form 3D multimedia stream. Streaming server 128 then streams the correlated 3D multimedia stream to one or more of user's multimedia devices 108.

Also, although certain terms are used primarily herein, other terms could be used interchangeably to yield equivalent embodiments and examples. For example, The terms "multimedia" and "audio/video" are used interchangeably throughout the document. The terms "dynamic" and "automatic" are also used interchangeably throughout the document.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Figure 2:
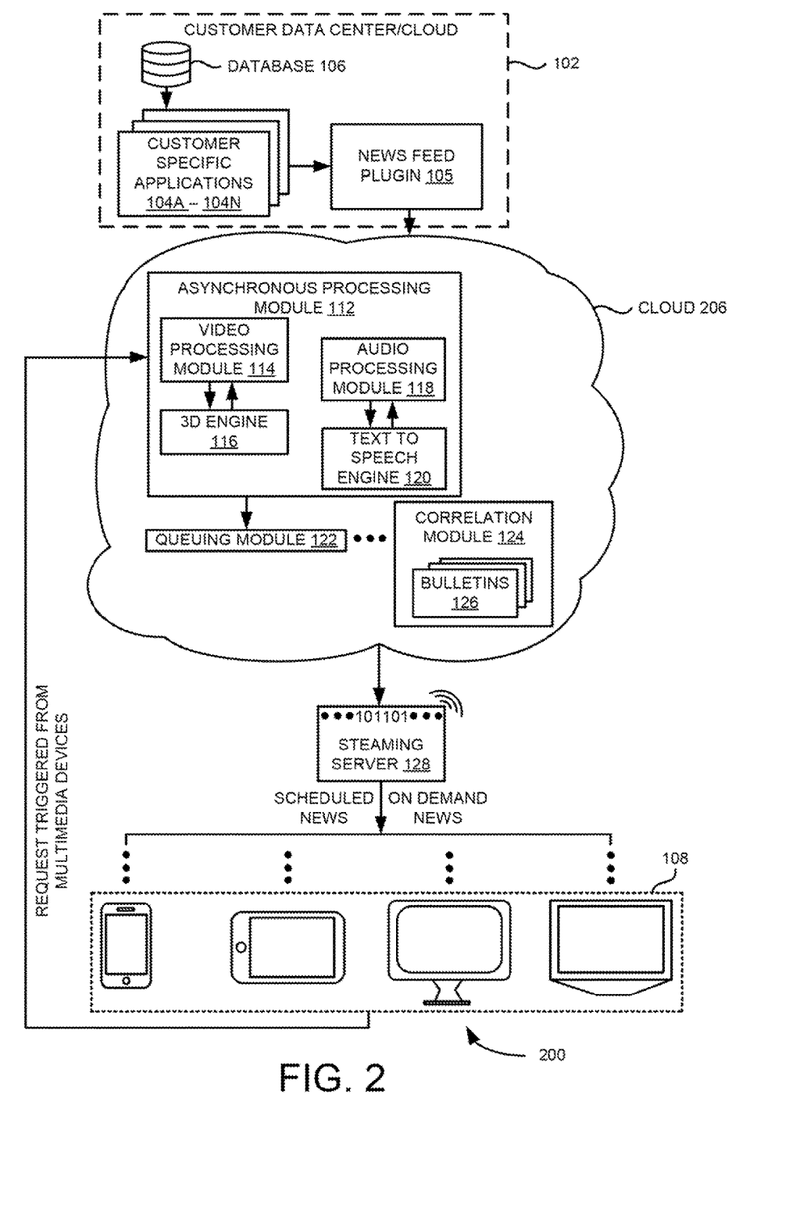
FIG. 2 is a block diagram illustrating a system for generating automated multimedia feed based on customer specific application software running on cloud, according to an example embodiment.

FIG. 2 is a block diagram illustrating a system 200 for automatic generation of multimedia feed based on customer specific application software running on cloud 206, according to an example embodiment. FIG. 2 is similar to FIG. 1 except for the customer specific application software running on a cloud as opposed to running on a customer datacenter, as shown in FIG. 1. The operation of system 200 is same as described above with reference to FIG. 1.

Example Processes

Figure 5:
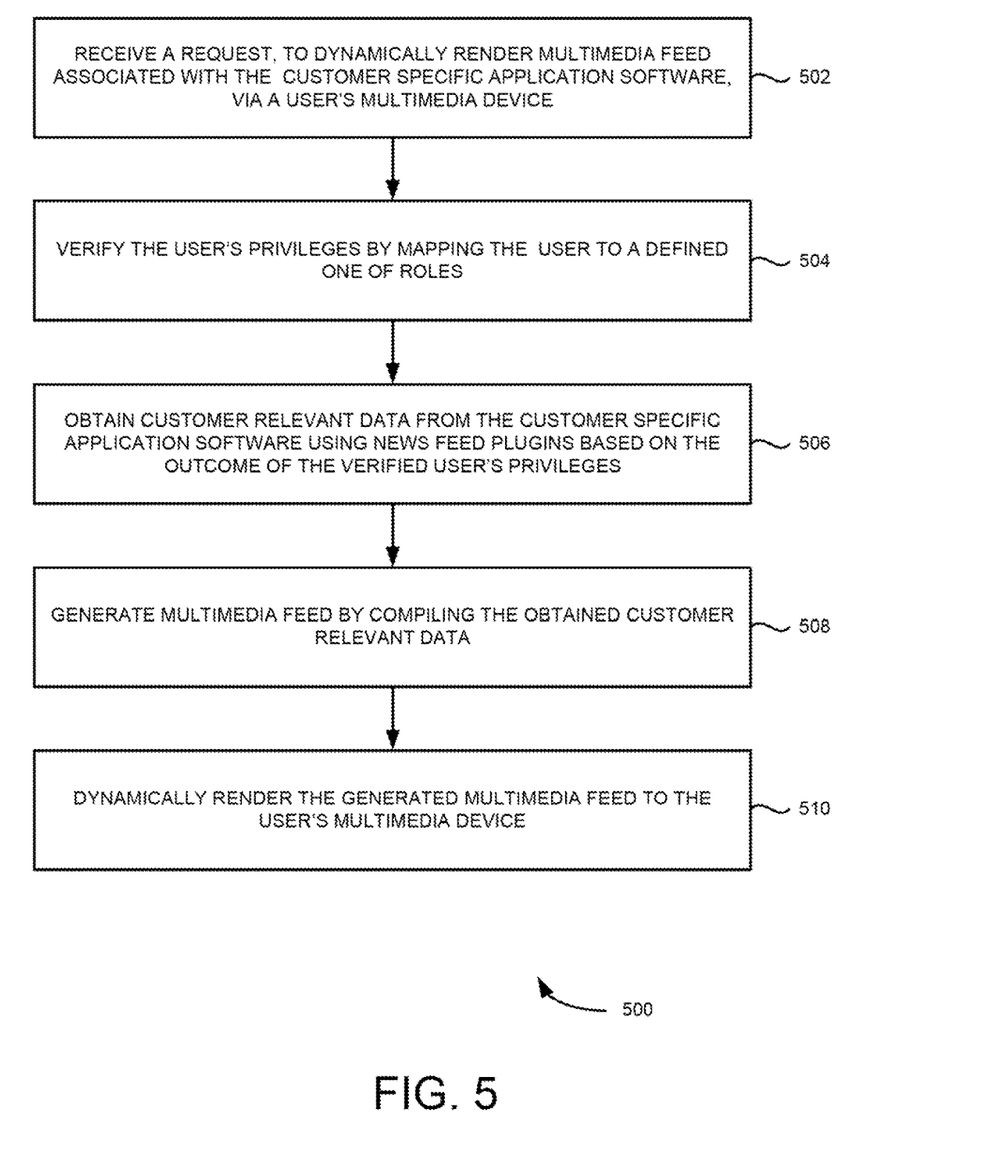
FIG. 5 is a flow diagram of process for generating automated multimedia feed based on customer specific software application running on customer datacenter/cloud, according to an example embodiment.

FIG. 5 is a flow diagram of a process 500, automatic generation of multimedia feed based on customer specific application software running on customer datacenters and/or cloud, according to an example embodiment.

At block 502, process 500 is configured to receive a request to dynamically render multimedia feed associated with the customer specific software applications via user's/customer's multimedia devices. Example multimedia feed includes audio feed and/or video feed. Example multimedia devices are mobile computing devices and/or desktop computing devices. In some embodiments, the process 500 begins with a user triggering for on-demand news associated with customer specific software applications running on customer datacenters and/or clouds.

At block 504, the customer's/user's privileges are verified by mapping the customer/user to a defined one of roles. Example roles are administrator, manager or executive.

At block 506, the customer relevant data from the customer specific application software using news feed plug-ins is obtained based on the outcome of the verified customer's/user's privileges. Example customer relevant data are health information, risk information, efficiency data, productivity data, financial information, sales data, compliance data, alerts, events, relationships and reports. It can be envisioned that the software plug-ins can reside in customer datacenters/clouds and/or management server. At block 508, 3D multimedia feed is generated by compiling the obtained customer relevant data. In these embodiments, alerts, typically, provides with a list of problems in the customer datacenter/cloud. Also in these embodiments, reports and views provide on-demand information about various customer relevant data based on customer specific application software running on customer datacenter/cloud. Further in these embodiments, customer relevant data, i.e., information, reports and/or messages, typically, contain information about the customer specific application software running on customer datacenters/clouds.

Figure 3:
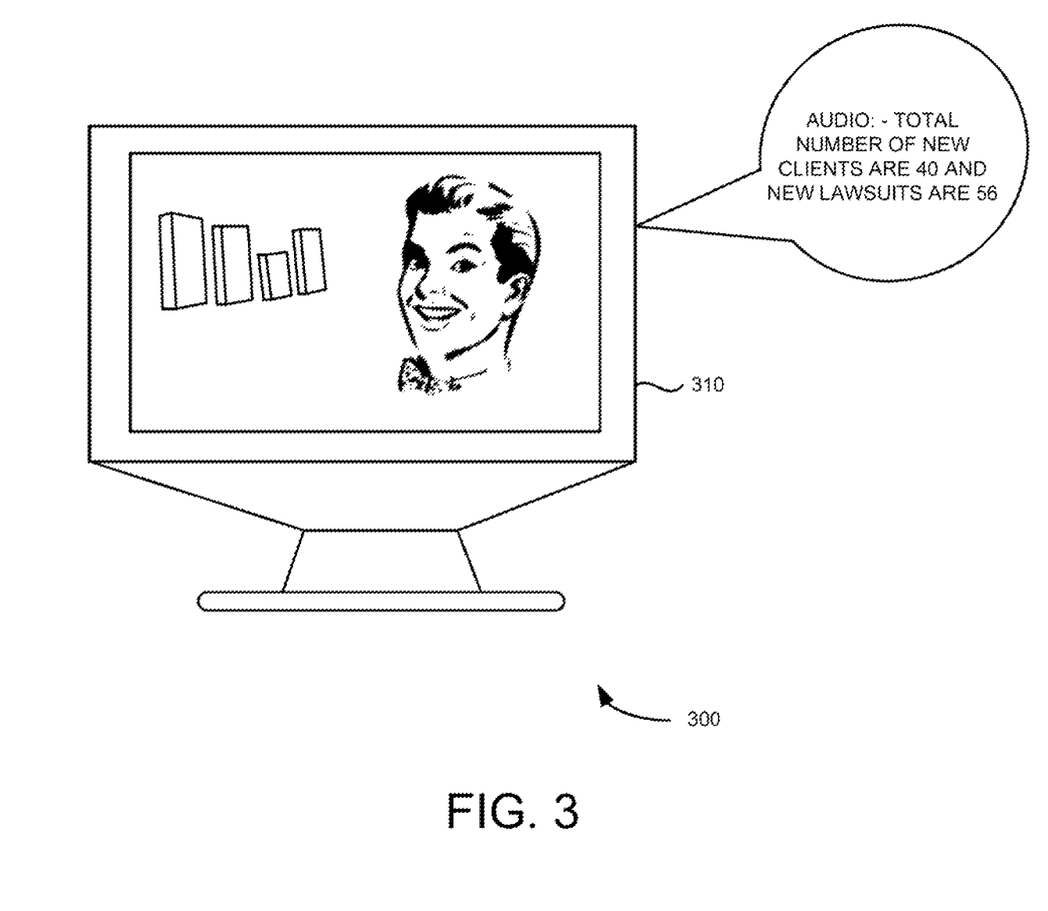
FIG. 3 is another example block diagram illustrating a dynamically rendered multimedia feed to the users via a television to draw attention to added new clients and number of lawsuits handled by the law firm.
Figure 4:
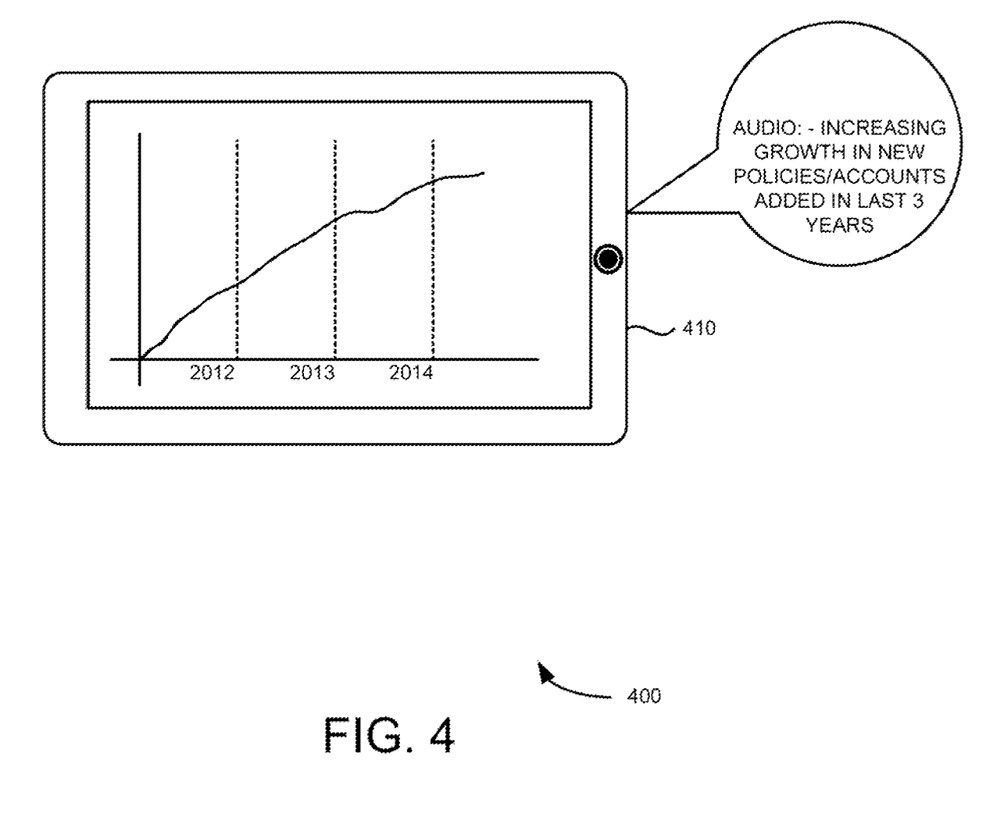
FIG. 4 is yet another example block diagram illustrating a dynamically rendered multimedia feed to the users via a Smartphone to draw attention regarding exceeding the target for adding new policies in the last 3 years.

At block 510, generated three-dimensional (3D) multimedia feed is dynamically rendered to the customers/users multimedia devices using the compiled customer relevant data. In some embodiments, the 3D multimedia feed is dynamically rendered substantially simultaneously by combining both the audio feed and the video feed. In some embodiments, the compiled customer relevant data is sent for further processing to dynamically render the 3D multimedia feed by using compiled customer relevant data, i.e., aggregated customer relevant data by adding any needed animated characters to stimulate multimedia news feed reading. FIG. 3 is a block diagram illustrating an example dynamically rendered multimedia feed to the law firm customers/users via a television to draw attention to added new clients and number of lawsuits handled by the law firm. FIG. 4 is a block diagram illustrating an example dynamically rendered multimedia feed to the customers/users via a television to draw attention regarding exceeding the target for adding new policies/accounts in the last 3 years.

Further in some embodiments, the audio feed is generated by converting subjective meaningful text in the obtained customer relevant data into speech. Furthermore in some embodiments, a database including descriptive texts is maintained for each type of customer relevant data to report out. The audio feed is then generated by mapping subjective meaningful text in the obtained customer relevant data to the database of descriptive texts.

In some embodiments, dynamically rendering the 3D multimedia feed includes first assigning a unique tag id (i.e., a universally unique identifier (UUID) for each message in the customer relevant data. In these embodiments, parts of the message are used by the video and audio components separately. Each message having associated UUID is then parsed into one or more audio messages and one or more video messages. One or more audio feeds and associated one or more video feeds are then generated by the multimedia feed generator using the associated parsed one or more audio messages and one or more video messages having same UUIDs. In these embodiments, multimedia feed generator processes the parts independently and renders the video and audio. The generated one or more audio feeds and one or more video feeds having same UUID are then queued. In these embodiments, processed output from each component is then queued until all video and audio feeds are available for dynamic rendering of news feed. The one or more queued audio feeds and the one or more video feeds are then correlated. The 3D multimedia feed is then streamed using the correlated one or more audio feeds and the associated one or more video feeds to one of customer's/user's multimedia devices. Combining the one or more video feeds and the associated one or more audio feeds result in a video file, which are referred to as "bulletins" having example formats MPEG-4 (Moving Picture Experts Group-4) or FLV (flash video), which is then dynamically rendered via streaming to the customer/user multimedia devices associated with the customers/users. Bulletins are pieces of news information delivered to the clients via customer/user multimedia devices.

In these embodiments, the 3D multimedia feed rendering, for example, 3D rendering of datacenter objects and its alerts is achieved by fetching the resource information from the source database. Further in these embodiments, the process 500 is configured to obtain all the needed resource information from the source database 106 shown in FIGS. 1 and 2, even including the resource hierarchy.

Process 500 for automatic generation of multimedia feed based on customer specific application software running on customer datacenters/clouds is explained in more detail above with reference to the system diagrams 100-400 shown in FIGS. 1-4.

The architecture/customer datacenter/cloud shown in FIGS. 1-5 may in some embodiments be partially or fully virtualized. For example, systems and method 100, 200 and 500 shown in FIG. 1, FIG. 2 and FIG. 5, respectively, may be one or possibly many VMs executing on physical hardware and managed by a hypervisor, VM monitor, or similar technology. Also, multiple host computing systems may include virtualization logic to manage multiple VMs.

In an example embodiment, components/modules of VMS 106, asynchronous processing module 112 (shown in FIGS. 1 and 2) and DRS may be implemented using standard programming techniques. In other embodiments, VMS 106 and asynchronous processing module 112 may be implemented as instructions processed by a VM that executes as one of other programs. Even though the above technique is described with reference to asynchronous processing module 112 being residing in VMS 106, which in turn is residing in management server 130 or cloud 206, one skilled in the art can envision that asynchronous processing module 112 can be residing in another host computing system and/or a management server that manages and monitors the one or more virtual datacenters. In these embodiments, asynchronous processing module 112 is configured to be a utility application that is not part of VMS 106 and further configured to obtain data from management software, such as VMS 106.

Furthermore, in some embodiments, some or all of the components of VMS 106, asynchronous processing module 112, and DRS may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for automatic generation of multimedia feed based on customer specific application software are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for automatic generation of multimedia feed based on customer specific application software running in a customer datacenter or in a cloud, comprising:
receiving a request, to dynamically render multimedia feed associated with the customer specific application software, via a user's multimedia device;
verifying the user's privileges by mapping the user to a defined one of roles;
obtaining customer relevant data from the customer specific application software using news feed plug-ins based on the outcome of the verified user's privileges;
generating multimedia feed by compiling the obtained customer relevant data; and
dynamically rendering the generated multimedia feed to the user's multimedia device, wherein dynamically rendering the generated multimedia feed comprises:
assigning a unique tag id (UUID) for each message in the customer relevant data;
parsing each message having associated UUID into one or more audio messages and one or more video messages;
generating one or more audio feeds and associated one or more video feeds using the associated parsed one or more audio messages and one or more video messages having same UUIDs;
queuing until all the associated one or more audio feeds and the one or more video feeds having same UUIDs are received;
correlating the queued one or more audio feeds and the associated one or more video feeds to form multimedia feed; and
streaming the formed multimedia feed to one of user's multimedia devices.

2. The method of claim 1, wherein the user's multimedia devices are selected from the group consisting of mobile computing devices and desktop computing devices.

3. The method of claim 1, wherein the customer relevant data is selected from the group consisting of health information, risk information, efficiency data, productivity data, financial information, sales information, compliance data, alerts, messages, events, views, relationships and reports.

4. The method of claim 1, wherein the defined roles are selected from the group consisting of administrator, manager or executive.

5. The method of claim 1, where in the multimedia feed includes audio feed and/or video feed.

6. The method of claim 5, wherein the multimedia feed comprises three-dimensional (3D) multimedia feed and wherein dynamically rendering the generated multimedia feed comprises:
dynamically rendering the 3D multimedia feed by simultaneously combining both the audio feed and the video feed.

7. The method of claim 6, wherein the audio feed is generated by converting subjective meaningful text in the obtained customer relevant data into speech.

8. The method of claim 6, wherein generating the audio feed for the multimedia feed comprises:
maintaining a database of descriptive texts for each type of problem that the customer datacenter is configured to report out; and
generating the audio feed by mapping subjective meaningful text in the obtained customer relevant data to the descriptive texts in the database.

9. A non-transitory computer-readable storage medium including instructions that are configured, when executed by a computing system, to perform a method for generating multimedia feed based on customer specific application software running in a datacenter and/or in a cloud, the method comprising:
receiving a request, to dynamically render multimedia feed associated with the customer specific application software, via a user's multimedia device;
verifying the user's privileges by mapping the users to a defined one of roles;
obtaining customer relevant data from the customer specific application software using news feed plug-ins based on the outcome of the verified user's privileges;

generating multimedia feed by compiling the obtained customer relevant data based on obtained customer relevant data; and dynamically rendering the generated multimedia feed to the user's multimedia device, wherein dynamically rendering the multimedia feed comprises:

assigning a unique tag id (UUID) for each message in the customer relevant data;

parsing each message having associated UUID into one or more audio messages and one or more video messages;

generating one or more audio feeds and associated one or more video feeds using the associated parsed one or more audio messages and one or more video messages having same UUIDs;

queuing until all the associated one or more audio feeds and the one or more video feeds having same UUIDs are received;

correlating the queued one or more audio feeds and the associated one or more video feeds to form multimedia feed; and streaming the formed multimedia feed to one of user's multimedia devices.

10. The non-transitory computer-readable storage medium of claim 9, wherein the customer relevant data is selected from the group consisting of health information, risk information, efficiency data, productivity data, financial information, sales information, compliance data, alerts, messages, events, views, relationships and reports.

11. The non-transitory computer-readable storage medium of claim 9, wherein the defined roles are selected from the group consisting of administrator, manager or executive.

12. The non-transitory computer-readable storage medium of claim 9, where in the multimedia feed includes audio feed and/or video feed.

13. The non-transitory computer-readable storage medium of claim 12, wherein dynamically rendering the multimedia feed comprises:

dynamically rendering the multimedia feed by simultaneously combining both audio feed and video feed.

14. The non-transitory computer-readable storage medium of claim 13, wherein the audio feed is generated by converting subjective meaningful text in the obtained customer relevant data into speech.

15. The non-transitory computer-readable storage medium of claim 13, wherein generating the audio feed for the multimedia feed comprises:

maintaining a database of descriptive texts for each type of problem that the customer datacenter is configured to report out; and generating the audio feed by mapping subjective meaningful text in the obtained customer relevant data to the database of descriptive texts.

16. A computing system for generating multimedia feed based on customer specific application software running on customer datacenter and/or in a cloud, the system comprising:

a streaming server;

one or more user's multimedia devices coupled to the streaming server; and a management server or a cloud hosting service wherein the management server comprising virtual management software (VMS), and wherein the VMS includes an asynchronous processing module to:

receive a request, to dynamically render multimedia feed associated with the customer specific application software, via a user's multimedia device;

verify the user's privileges by mapping the user to a defined one of roles;

obtain customer relevant data from the customer specific application software using news feed plug-ins based on the outcome of the verified user's privileges;

generate multimedia feed by compiling the obtained customer relevant data based on obtained customer relevant data; and dynamically render the generated multimedia feed to the user's multimedia device, wherein the asynchronous processing module assigns a unique tag id (UUID) for each message in the customer relevant data, parses each message having associated UUID into one or more audio messages and one or more video messages, generates one or more audio feeds and associated one or more video feeds using the associated parsed one or more audio messages and one or more video messages having same UUIDs by a multimedia feed generator, queues until all the associated one or more audio feeds and the one or more video feeds having same UUIDs are received, correlates the queued one or more audio feeds and the associated one or more video feeds, and streams the multimedia feed using the correlated one or more audio feeds and the associated one or more video feeds to one of user's multimedia devices.

17. The computing system of claim 16, wherein the multimedia devices are selected from the group consisting of mobile computing devices and desktop computing devices.

18. The computing system of claim 16, wherein the customer relevant data is selected from the group consisting of health information, risk information, efficiency data, productivity data, financial information, sales information, compliance data, alerts, messages, events, views, relationships and reports.

19. The computing system of claim 16, wherein the defined roles are selected from the group consisting of administrator, manager or executive.

20. The computing system of claim 16, wherein the multimedia feed comprises a three-dimensional (3D) multimedia feed.

21. The computing system of claim 16, wherein the multimedia feed includes audio feed and/or video feed.

22. The computing system of claim 21, wherein the asynchronous processing module is configured to dynamically render the multimedia feed by simultaneously combining both audio feed and video feed.

23. The computing system of claim 22, wherein the multimedia feed generator generates the audio feed by converting subjective meaningful text in the obtained customer relevant data into speech.

24. The computing system of claim 22, wherein the multimedia feed generator maintains a database of descriptive texts for each type of customer relevant data to report out, and wherein the asynchronous processing module generates the audio feed by mapping subjective meaningful text in the obtained customer relevant data to the database of descriptive texts.

* * * * *